US012556873B2

(12) United States Patent
Hansen et al.

(10) Patent No.: US 12,556,873 B2
(45) Date of Patent: Feb. 17, 2026

(54) HEARING DEVICE, FITTING DEVICE, FITTING SYSTEM, AND RELATED METHOD

(71) Applicant: GN Hearing A/S, Ballerup (DK)

(72) Inventors: Kim Heegaard Hansen, Sengeløse (DK); Job Geurts, Eindhoven (NL)

(73) Assignee: GN HEARING A/S, Ballerup (DK)

( * ) Notice: Subject to any disclaimer, the term of this patent is extended or adjusted under 35 U.S.C. 154(b) by 288 days.

(21) Appl. No.: 18/346,650

(22) Filed: Jul. 3, 2023

(65) Prior Publication Data

US 2024/0015457 A1 Jan. 11, 2024

(30) Foreign Application Priority Data

Jul. 8, 2022 (DK) ............................ PA 2022 0661

(51) Int. Cl.
*H04R 25/00* (2006.01)

(52) U.S. Cl.
CPC .......... *H04R 25/70* (2013.01); *H04R 25/554* (2013.01); *H04R 25/552* (2013.01)

(58) Field of Classification Search
CPC ..... H04R 25/70; H04R 25/554; H04R 25/552
USPC .......................................................... 381/314
See application file for complete search history.

(56) References Cited

U.S. PATENT DOCUMENTS

| | | | |
|---|---|---|---|
| 9,197,972 | B2 | 11/2015 | Tran et al. |
| 9,398,385 | B2 | 7/2016 | Schneider et al. |
| 10,785,579 | B2 | 9/2020 | Aase et al. |
| 2007/0230711 | A1 | 10/2007 | Hasler et al. |
| 2011/0200213 | A1 | 8/2011 | Knox |
| 2013/0024798 | A1 | 1/2013 | Schneider et al. |
| 2013/0329924 | A1 | 12/2013 | Fleizach et al. |
| 2017/0142527 | A1 | 5/2017 | Pedersen et al. |
| 2018/0338330 | A1 | 11/2018 | Ledvina et al. |
| 2020/0213783 | A1 | 7/2020 | Shennib |

FOREIGN PATENT DOCUMENTS

| | | | |
|---|---|---|---|
| EP | 2439963 A2 | 4/2012 | |
| EP | 1701585 B1 | 6/2012 | |
| EP | 2 991 380 A1 | 3/2016 | |
| WO | WO 2010/072845 | 7/2010 | |
| WO | WO 2019/052668 | 3/2019 | |

OTHER PUBLICATIONS

Extended European Search Report for EP Patent Appln. No. 23182647.0 dated Nov. 30, 2023.

Foreign 1st Technical Examination for Danish Patent Appln. No. PA 2022 00661 dated Dec. 20, 2022.

*Primary Examiner* — Sean H Nguyen

(74) *Attorney, Agent, or Firm* — Vista IP Law Group, LLP

(57) ABSTRACT

A fitting device for fitting a hearing device. The fitting device comprising a fitting device interface and a fitting device processing unit. The fitting device processing unit is configured to obtain a list of hearing devices; output an initial discovery representation on the fitting device interface based on the list of hearing devices; receive a first control signal from an activated hearing device from the list of hearing devices, the first control signal being indicative of a user activation of the activated hearing device; determine a first discovery representation based on the first control signal; and output the first discovery representation on the fitting device interface.

36 Claims, 8 Drawing Sheets

HEARING DEVICE, FITTING DEVICE, FITTING SYSTEM, AND RELATED METHOD

RELATED APPLICATION DATA

This application claims priority to, and the benefit of, Danish Patent Application No. PA 2022 0661 filed on Jul. 8, 2022. The entire disclosure of the above application is expressly incorporated by reference herein.

FIELD

The present disclosure relates to a fitting device for fitting a hearing device, a hearing device and a fitting system comprising the fitting device and the hearing device.

BACKGROUND

During a fitting session for hearing devices, it may be necessary to identify a specific hearing device, among two or more hearing devices, which is activated to be fitted. Typically, hearing devices are designed to emit, when they have been activated e.g. by being selected in/on the fitting device, an identification tone that the user can hear by holding the hearing device up to an ear. Put another way, the user may be required to make a hearing effort to identify the activated hearing device. Such hearing devices may comprise a receiver to receive a control signal from a fitting device that activates the emission of the tone, e.g. the control signal instruct the hearing device to generate an identification tone which is then played by the hearing device. This may add to the complexity of the hearing device.

SUMMARY

Accordingly, there may be a need for fitting devices that may allow for a manageable identification of the hearing device that is activated to be fitted.

A fitting device, for fitting a hearing device, is disclosed. The fitting device comprises a fitting device interface and a fitting device processing unit. The fitting device processing unit may be configured to obtain a list of hearing devices. The fitting device processing unit may be configured to output an initial discovery representation on the fitting device interface based on the list of hearing devices. The fitting device processing unit may be configured to receive a first control signal from an activated hearing device from the list of hearing devices, the first control signal being indicative of a user activation of the activated hearing device and/or the first control signal being transmitted by the activated hearing device in response to the activated hearing device being activated by a user/fitter. The activated hearing device may be represented on the list of hearing devices prior to the user activation. The fitting device processing unit may be configured to determine a first discovery representation based on the first control signal. The fitting device processing unit may be configured to output the first discovery representation on the fitting device interface.

Further, a hearing device is disclosed. The hearing device comprises a hearing device interface and a hearing device processing unit. The hearing device is configured to detect a user activation of the hearing device and transmit a first control signal indicative of the user activation.

Also, a fitting system may be provided. The fitting system may comprise any fitting device disclosed herein and any hearing device disclosed herein.

A method for operating a fitting device may be provided. The method comprises obtaining a list of hearing devices. The method may comprise outputting an initial discovery representation based on the list of hearing devices and receiving a first control signal from an activated hearing device from the list of hearing devices, the first control signal optionally being indicative of a user activation of the activated hearing device and/or the first control signal optionally being transmitted by the activated hearing device in response to the activated hearing device being activated by a user/fitter, wherein the activated hearing device may be represented on the list of hearing devices prior to the user activation. The method may comprise determining a first discovery representation based on the first control signal. The method may comprise outputting the first discovery presentation.

The fitting devices, hearing devices, fitting systems and methods provided herein may be advantageous in that a user/fitter may benefit from a quick and intuitive identification of the activated hearing device among the devices on the list of hearing devices. Such identification may avoid the need for other identification elements, such as a receiver in the hearing device configured to receive a control signal that controls the emission of identification tones. This may be useful, for instance, for fittings taking place in noisy environments.

Advantageously, a simplified fitting procedure is provided. Further, the risk of fitting a wrong hearing device is reduced in turn providing a fail-safe fitting procedure.

BRIEF DESCRIPTION OF THE DRAWINGS

The above and other features and advantages of the present invention will become readily apparent to those skilled in the art by the following detailed description of exemplary embodiments thereof with reference to the attached drawings, in which.

DETAILED DESCRIPTION

Figure 1:
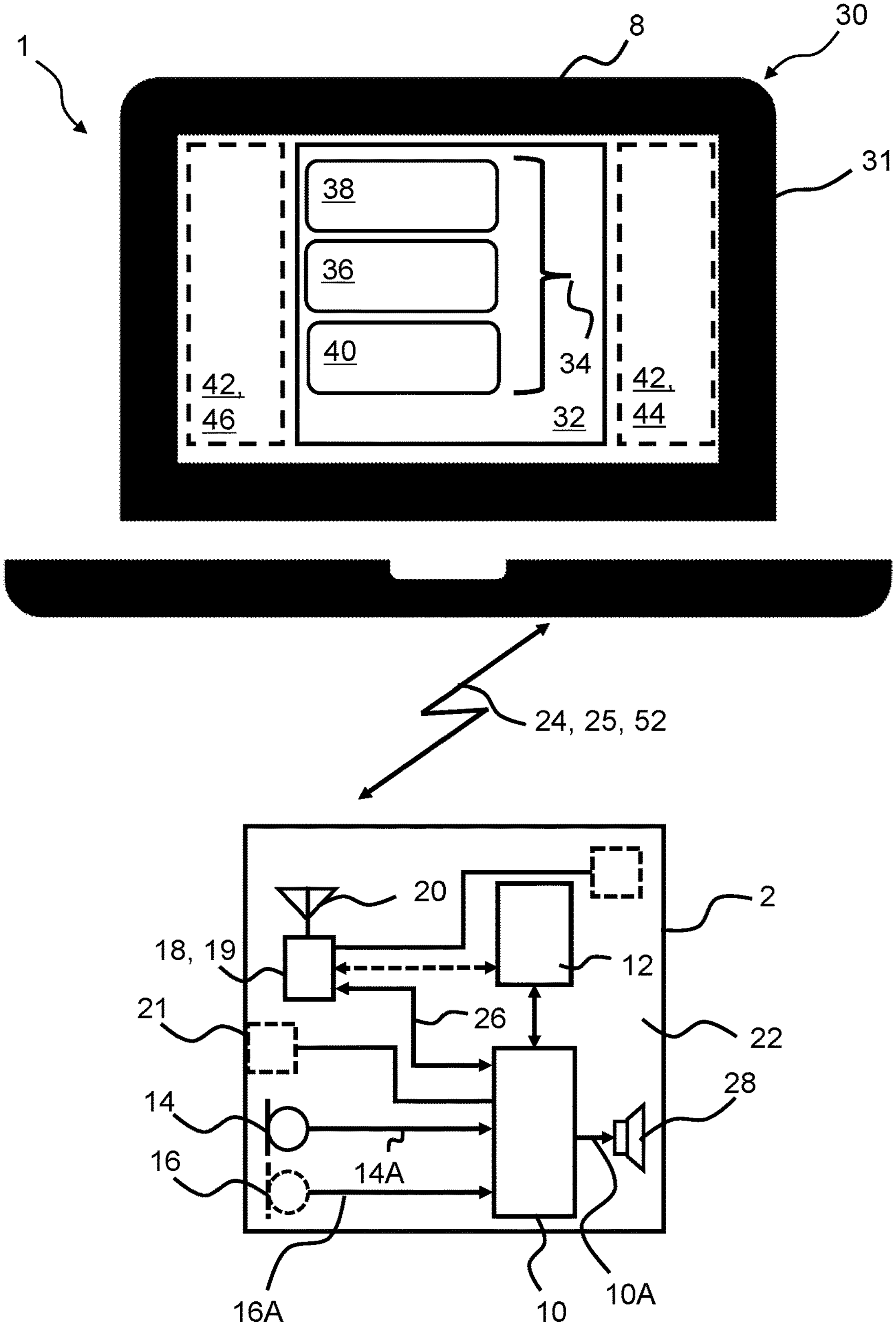
FIG. 1 schematically illustrates an exemplary fitting system.

Various example fitting devices, hearing devices, fitting systems, and methods are described hereinafter, with reference to the figures when relevant. It should be noted that the figures may or may not be drawn to scale. It should also be noted that the figures are only intended to facilitate the description of various embodiments. They are not intended as an exhaustive description of the invention or as a limitation on the scope of the invention. In addition, an illustrated embodiment needs not have all the aspects or advantages shown.

A hearing device is disclosed. In an embodiment, the hearing device is configured to be worn by a user. The hearing device may be arranged at the user's ear, on the user's ear, over the user's ear, in the user's ear, in the user's ear canal, behind the user's ear and/or in the user's concha, i.e., the hearing device is configured to be worn in, on, over and/or at the user's ear. The user may wear two hearing devices, one hearing device at each ear. The two hearing devices may be connected, such as wirelessly connected and/or connected by wires, such as a binaural hearing device system. The hearing device may be a hearable a personal sound amplification product (PSAP), an over-the-counter (OTC) hearing device, a one-size-fits-all hearing device, a custom hearing device or another head-wearable hearing device. Hearing devices can include both prescription devices and non-prescription devices. The hearing device may be a hearing aid, wherein a hearing device processing unit is configured to compensate for a hearing loss of a user. The hearing device may be a contralateral routing of signals (CROS) hearing device configured to transmit sound, through a wired or a wireless connection, collected via one or more microphones at the non-hearing ear of the user, to a hearing device at the users hearing ear which then outputs sound/acoustic signals received at both the non-hearing ear and the hearing ear of the user.

In an embodiment, the hearing device may be embodied in various housing styles or form factors. Some of these form factors are Behind-the-Ear (BTE) hearing device or Receiver-in-Canal (RIC) hearing device also known as Receiver-in-Ear (RIE) hearing device or Microphone-and-Receiver-in-Ear (MaRIE) hearing device. These devices may comprise a behind the ear (BTE) unit configured to be worn behind the ear of the user and an in the ear (ITE) unit configured to be inserted partly or fully into the user's ear canal. Generally, the BTE unit may comprise at least one input transducer, a power source and a hearing device processing unit. The term BTE hearing device refers to a hearing device where the receiver, i.e. the output transducer, is comprised in the BTE unit and sound is guided to the ITE unit via a sound tube connecting the BTE and ITE units, whereas the terms RIE, RIC and MaRIE hearing devices refer to hearing devices where the output transducer may be comprise in the ITE unit, which is coupled to the BTE unit via a connector cable or electrical wire/tube configured for transferring electric signals between the BTE and ITE units.

Some of these form factors are In-the-Ear (ITE) hearing device, Completely-in-Canal (CIC) hearing device or Invisible-in-Canal (IIC) hearing device. These hearing devices may comprise an ITE unit, wherein the ITE unit may comprise at least one input transducer, a power source, a hearing device processing unit and an output transducer. These form factors may be custom devices, meaning that the ITE unit may comprise a housing having a shell made from a hard material, such as a hard polymer or metal, or a soft material such as a rubber-like polymer, molded to have an outer shape conforming to the shape of the specific user's ear canal.

Some of these form factors are earbuds. The person skilled in the art is well aware of different kinds of hearing devices and of different options for arranging the hearing device in, on, over and/or at the ear of the hearing device wearer. The hearing device (or pair of hearing devices) may be custom fitted, standard fitted, open fitted and/or occlusive fitted.

In an embodiment, the hearing device may comprise one or more input transducers. The one or more input transducers may comprise one or more microphones. The one or more input transducers may comprise one or more vibration sensors configured for detecting bone vibration. The one or more input transducer(s) may be configured for converting an acoustic signal into a first electric input signal. The first electric input signal may be an analogue signal. The first electric input signal may be a digital signal. The one or more input transducer(s) may be coupled to one or more analogue-to-digital converter(s) configured for converting the analogue first input signal into a digital first input signal.

In an embodiment, the hearing device comprises a hearing device interface and a hearing device processing unit. The hearing device may comprise a memory.

The hearing device/hearing device interface may be configured for wireless communication with a fitting device and optionally one or more audio devices, also denoted as audio sources. The hearing device/hearing device interface may be configured for wireless communication with one or more accessory devices, such as a tablet computer, a laptop computer, a smartphone and/or a smart watch. An accessory device may operate, be, and/or function as an audio device. An accessory device may operate, be, and/or function as a fitting device. The hearing device/hearing device interface optionally comprises one or more antennas for converting one or more wireless input signals to antenna output signal(s). The wireless input signal(s) optionally comprises or are representative of audio data. In other words, the audio data may be encoded in the wireless input signal(s). The wireless input signal(s) may origin from external audio source(s), such as audio devices, e.g. spouse microphone device(s), wireless TV audio transmitter(s), music player(s), car(s), doorbell(s), mobile phone(s), smart watch(es), and wireless audio transmitters(s), such as public wireless audio transmitter(s), e.g. in airports, train stations, stadiums, cinemas, and/or arenas. The wireless input signal(s) may origin from one or more accessory devices. The wireless input signal(s) may origin from a fitting device, e.g. comprising fitting data, such as firmware and/or fitting parameters, transmitted to the hearing device for fitting and/or updating the hearing device. The wireless input signal(s) may origin from another hearing device, e.g., as part of a binaural or bilateral hearing device system.

The one or more antenna(s) may comprise an electric antenna. The electric antenna may be configured for wireless communication at a first frequency. The first frequency may be above 800 MHz, preferably a wavelength between 900 MHz and 6 GHz. The first frequency may be 902 MHz to 928 MHz. The first frequency may be 2.4 to 2.5 GHz. The first frequency may be 5.725 GHz to 5.875 GHz. The one or more antenna(s) may comprise a magnetic antenna. The magnetic antenna may comprise a magnetic core. The magnetic antenna may comprise a coil. The coil may be coiled around the magnetic core. The magnetic antenna may be configured for wireless communication at a second frequency. The second frequency may be below 100 MHz. The second frequency may be between 9 MHz and 15 MHz.

In an embodiment, the hearing device/hearing device interface comprises one or more wireless communication unit(s). The one or more wireless communication unit(s) may comprise one or more wireless receiver(s), one or more wireless transmitter(s), one or more transmitter-receiver pair(s) and/or one or more transceiver(s). At least one of the one or more wireless communication unit(s) may be coupled to the one or more antenna(s). The wireless communication unit may be configured for converting a wireless signal received by at least one of the one or more antenna(s) into a second electric input signal. The hearing device may be configured for wired/wireless audio communication, e.g.

enabling the user to listen to media, such as music or radio and/or enabling the user to perform phone calls. The wireless communication unit may be configured for converting the antenna output signal to audio data and/or fitting data. Wireless signals from different external sources may be multiplexed in the wireless communication unit to audio data and/or fitting data or provided as separate audio data and/or fitting data on separate output terminals of the wireless communication unit. The hearing device may comprise a plurality of antennas and/or an antenna may be configured to be operate in one or a plurality of antenna modes.

The hearing device comprises a hearing device processing unit for processing audio data and/or fitting data, such as pre-processed transceiver input signal(s) and/or pre-processed microphone input signal(s). The hearing device processing unit provides an electric output signal based on the input signals/audio data to the hearing device processing unit. Input terminal(s) of the hearing device processing unit are optionally connected to respective output terminals of a pre-processing unit. For example, a transceiver input terminal of the hearing device processing unit may be connected to a transceiver output terminal of the pre-processing unit. One or more microphone input terminals of the hearing device processing unit may be connected to respective one or more microphone output terminals of the pre-processing unit. The hearing device processing unit may be configured for processing the first and/or second electric input signal(s). The hearing device processing unit may comprise compensating for a hearing loss of the user, i.e., apply frequency dependent gain to input signals in accordance with the user's frequency dependent hearing impairment. The processing may comprise performing feedback cancelation, beamforming, tinnitus reduction/masking, noise reduction, noise cancellation, speech recognition, bass adjustment, treble adjustment and/or processing of user input. The hearing device processing unit may be a processor, an integrated circuit, an application, functional module, etc. The hearing device processing unit may be implemented in a signal-processing chip or a printed circuit board (PCB). The hearing device processing unit may be configured to provide a first electric output signal based on the processing of the first and/or second electric input signal(s). The hearing device processing unit may be configured to provide a second electric output signal. The second electric output signal may be based on the processing of the first and/or second electric input signal(s).

In an embodiment, the hearing device may comprise an output transducer. The output transducer may be coupled to the hearing device processing unit. The output transducer may be a receiver. It is noted that in this context, a receiver may be a loudspeaker, whereas a wireless receiver may be a device configured for processing a wireless signal. The receiver may be configured for converting the first electric output signal into an acoustic output signal. The output transducer may be coupled to the hearing device processing unit via the magnetic antenna. The output transducer may be comprised in an ITE unit or in an earpiece, e.g. Receiver-in-Ear (RIE) unit or Microphone-and-Receiver-in-Ear (MaRIE) unit, of the hearing device. One or more of the input transducer(s) may be comprised in an ITE unit or in an earpiece.

The hearing device, such as the wireless communication unit and/or hearing device processing unit, may be configured to determine an audio output scheme. The hearing device may be configured to provide, e.g. via a receiver or loudspeaker of the hearing device interface, an audio output according to the audio output scheme. In other words, the hearing device may be configured to provide an electric output according to the audio output scheme and convert the electric output to audio output using a receiver or loudspeaker of the hearing device interface.

In an embodiment, the wireless communication unit may be configured for converting the second electric output signal into a wireless output signal. The wireless output signal may comprise synchronization data. The wireless communication unit may be configured for transmitting the wireless output signal via at least one of the one or more antennas.

In an embodiment, the hearing device may comprise a digital-to-analogue converter configured to convert the first electric output signal, the second electric output signal and/or the wireless output signal into an analogue signal.

In an embodiment, the hearing device may comprise a vent. A vent is a physical passageway such as a canal or tube primarily placed to offer pressure equalization across a housing placed in the ear such as an ITE hearing device, an ITE unit of a BTE hearing device, a CIC hearing device, a RIE hearing device, a RIC hearing device, a MaRIE hearing device or a dome tip/earmold. The vent may be a pressure vent with a small cross section area, which is preferably acoustically sealed. The vent may be an acoustic vent configured for occlusion cancellation. The vent may be an active vent enabling opening or closing of the vent during use of the hearing device. The active vent may comprise a valve.

In an embodiment, the hearing device may comprise a power source. The power source may comprise a battery providing a first voltage. The battery may be a rechargeable battery. The battery may be a replaceable battery. The power source may comprise a power management unit. The power management unit may be configured to convert the first voltage into a second voltage. The power source may comprise a charging coil. The charging coil may be provided by the magnetic antenna.

In an embodiment, the hearing device may comprise a memory, including volatile and non-volatile forms of memory.

A fitting device for fitting a hearing device is disclosed. The fitting device comprises a fitting device interface and a fitting device processing unit, wherein the fitting device processing unit is configured to obtain a list of hearing devices; output an initial discovery representation on the fitting device interface based on the list of hearing devices; receive a first control signal from an activated hearing device from the list of hearing devices, the first control signal being indicative of a user activation of the activated hearing device and/or the first control signal being transmitted by the activated hearing device in response to the activated hearing device being activated by a user/fitter, wherein the activated hearing device may be represented on the list of hearing devices prior to the user activation; determine a first discovery representation based on the first control signal; and output, such as display, the first discovery representation on the fitting device interface, such as on a display of the fitting device interface.

In the present context, fitting of a hearing device is to be interpreted as adjusting various settings of the hearing device to fit the hearing condition and/or preferences of the hearing device user. At least hearing aids needs to be properly fitted to the user's ears so that they provide the correct amount of, e.g., amplification in terms of gain and compression to maximize hearing aid benefits. User's with hearables, personal sound amplification products (PSAP)

and OTC hearing devices will likewise benefit from having their devices properly fitted. The fitting device may thus be configured to control and/or configure the hearing device to compensate for a hearing loss of the user.

The user/fitter may be a Hearing Care Professional (HCP) using a Hearing Care Professional (HCP) device, such as the HCP's computer, tablet, etc., as a fitting device.

By obtaining the list of hearing devices and outputting the initial discovery representation on the fitting device interface based on the list of hearing devices, a user/fitter may advantageously be provided with a quick, intuitive identification of the available hearing devices. The list of hearing devices may thus be a list of available hearing devices detected/discovered by the fitting device. Available hearing devices may be hearing devices present within a predefined distance of the fitting device and/or hearing devices being turned on and/or hearing devices being turned on within a predefined time interval.

Upon reception of the first control signal from the activated hearing device from the list of hearing devices, the fitting device processing unit is capable of determining the first discovery representation, indicative of the activated hearing device, and of outputting such first discovery representation on the fitting device interface. Accordingly, a user/fitter may benefit from a quick, intuitive identification of the activated hearing device among the devices on the list of hearing devices. Such identification may avoid the need for other identification elements, such as a receiver in the hearing device configured to receive a control signal that controls the emission of identification tones and/or the need of manually reading the serial number on the hearing device selected for fitting and finding the corresponding serial number among the list of hearing devices on the fitting device interface. This may be useful, for instance, for fitting sessions taking place in noisy environments and/or when a serial number is difficult to read, e.g. due to an unclear text or small text size.

In one or more example fitting devices, the initial discovery representation comprises a schematic representation of the list of hearing devices. This may facilitate the identification of the available hearing devices.

The initial discovery representation may comprise a discovery region including the list of hearing devices. The initial discovery representation, such as the schematic representation and/or discovery region, may comprise a user interface element for each of the hearing devices in the list of hearing devices. The list of (available) hearing devices may be empty. In accordance with the list of available hearing devices being empty, the fitting device may be configured to include a user interface element indicative of no available hearing devices in the initial discovery representation.

The first discovery representation may comprise the discovery region including the list of hearing devices and a selection indicator of the activated hearing device. The selection indicator may enable a straightforward identification of the activated hearing device. The selection indicator may comprise one or more of: a colour indicator, a symbol indicator, a highlight indicator, an around-box indicator, a shading indicator and any other suitable indicator.

In one or more example fitting devices, the first discovery representation comprises the discovery region including the list of hearing devices and a first region separate from the discovery region. The activated hearing device may be represented, in the initial discovery representation, by an initial user interface element in the discovery region, together with other hearing devices from the list of hearing devices. The activated hearing device may be represented, in the first discovery representation, by a first user interface element in the first region. In other words, the initial user interface element and the first user interface element representing the activated hearing device may be arranged in different positions in the initial discovery representation and in the first discovery representation. The first user interface element may be a drag-and-drop user interface.

By representing the activated hearing device, in the initial discover representation, by the initial user interface element in the discovery region and, in the first discovery representation (that is, once it has been activated), by the first user interface element in the first region, separate from the discovery region, the visual identification of the activated hearing device may be emphasised. Thus, the identification of the activated hearing device may be eased.

The first region may comprise or be one or more of: a left region and a right region. The left region and the right region may be separate from each other. The left region may be arranged to the left of the discovery region and/or the right region may be arranged to the right of the discovery region (when looking at the display of the interface of the fitting device, i.e. a fitting device screen). When the first region comprises a left region and a right region, the first user interface element may be represented in the left region if the activated hearing device is a left hearing device, e.g. as indicated by a side identifier associated with the hearing device. Alternatively, the first user interface element may be represented in the right region if the activated hearing device is a left hearing device. The side identifier may be included in the first control signal and/or read from the hearing device during a discovery or scanning procedure prior to receiving the first control signal. When the first region comprises a left region and a right region, the first user interface element may be represented in the right region if the activated hearing device is a right hearing device. Alternatively, the first user interface element may be represented in the left region if the activated hearing device is a right hearing device.

The first region may comprise one or more of: a left region, a right region and a pop-up region. When the first region comprises a left region, a right region and a pop-up region, the first user interface element may be represented in the pop-up region if the activated hearing device is a hearing device that is suitable for the right ear and the left ear. The first user interface element may be represented in or forming the pop-up region. When the first user interface element is represented in the pop-up region, the pop-up region may comprise a selector to allow a user/fitter to assign the activated hearing device to the left region (if the hearing device is to be used in the left ear) or the right region (if the hearing device is to be used in the right ear). Alternatively, when the first user interface element is represented in the pop-up region, the pop-up region may comprise a selector to allow a user/fitter to assign the activated hearing device to the left region (if the hearing device is to be used in the right ear) or the right region (if the hearing device is to be used in the left ear).

In one or more example fitting devices, the first control signal is indicative of a force exerted on the activated hearing device. By allowing a user/fitter to activate a hearing device through the application of a force on the hearing device, the activation process may be simplified and shortened.

In the present context, an activated hearing device is a hearing device which is activated by the user/fitter to provide an identification signal configured to support the identification of a hearing device to be fitted. The user activation of the activated hearing device may not provide any changes to the hearing device configurations and/or hearing device settings and/or hearing device state. According to prior art the activation of the hearing device may be obtained through the fitting device by selecting a representation of the hearing device from a list of available hearing devices in/on the fitting device, whereafter the fitting device transmit a control signal to the hearing device, wherein the control signal instructs the hearing device to generate an identification tone as the identification signal which is then played by the hearing device. According to the invention a hearing device is selected, e.g. by the user/fitter, from a pile of hearing devices and the activation of the hearing device is obtained by exerting a force on/to the hearing device, whereafter the hearing device transmit a control signal to the fitting device as the identification signal, wherein the control signal instructs the fitting device to output, such as display, a user interface element representing the hearing device.

The force may by exerted by means of one or more of: a user activation of a button of the activated hearing device, a user movement of the activated hearing device, a user tap of the activated hearing device and any other suitable application of a force.

In one or more example fitting devices, the fitting device/fitting device processing unit is configured to receive a second control signal from the activated hearing device, the second control signal being indicative of a user customisation of the activated hearing device. The fitting device/fitting device processing unit may be configured to determine a second discovery representation, e.g. based on the second control signal; and output the second discovery presentation on the fitting device interface.

The second control signal may advantageously allow for a user customisation of the previously activated hearing device, that is, the hearing device may be activated and customised by means of first and second control signals. By outputting the second discovery presentation on the fitting device interface, the user/fitter may benefit from an intuitive identification of the customised features of the activated hearing device.

The second discovery representation may comprise the schematic representation of the list of hearing devices, the selection indicator of the activated hearing device and a customisation indicator of the activated hearing device. This may allow for an overview of the available hearing devices, the hearing device that has been activated and the features that have been customised in the activated hearing device that is easily perceived by the user/fitter.

The second control signal may be indicative of a user side choice, such as a left-hand side or a right-hand side, for the activated hearing device.

The second discovery representation may comprise a left area and right area. When the first user interface element is represented in the pop-up region, the second control signal may assign the activated hearing device to the left area (if the hearing device is to be used in the left ear) or the right area (if the hearing device is to be used in the right ear). Alternatively, when the first user interface element is represented in the pop-up region, the second control signal may assign the activated hearing device to the left area (if the hearing device is to be used in the right ear) or the right area (if the hearing device is to be used in the left ear).

In one or more example fitting devices, the second control signal is indicative of a force exerted on the activated hearing device. By allowing a user/fitter to customise a hearing device through the application of a force on the hearing device, the customisation process may be simplified and shortened.

The force may be exerted by means of one or more of: a user activation of a button of the activated hearing device, a user movement of the activated hearing device, a user tap of the activated hearing device and any other suitable application of a force.

In one or more example fitting devices, the second control signal is incorporated in and/or transmitted together with the first control signal. Incorporating the second control signal in/with the first control signal may result in a combined first and second control signal. The combined first and second control signal may be indicative of activation of the hearing device and a user side choice, such as a left-hand side or a right-hand side, for the activated hearing device. As an example, the first and second control signal transmitted from an activated hearing device which is and/or is to be assigned as a left hearing device (by/in the fitting device) may be indicative of one push of a button of the activated hearing device, a first user movement of the activated hearing device or one user tap of the activated hearing device and the first and second control signal transmitted from an activated hearing device which is and/or is to be assigned as a right hearing device (by/in the fitting device) may be indicative of two pushes of a button of the activated hearing device, a second user movement of the activated hearing device or two user taps of the activated hearing device.

A hearing device may be disclosed, such as a first, second and/or third hearing device. The hearing device comprises a hearing device interface and a hearing device processing unit, wherein the hearing device is configured to detect a user activation of the hearing device and transmit a first control signal indicative of a user activation.

The advantages noted for fitting devices provided herein may be applicable to the hearing device. In particular, the transmission of a first control signal, which may be received by a fitting device, may enable a user/fitter to benefit from a quick, intuitive identification of the hearing device. Such identification may avoid the need for other identification elements, such as a receiver in the hearing device selected for fitting to play identification tones and/or the need of manually reading the serial number on the hearing device selected for fitting and manually finding the corresponding serial number among the list of hearing devices on the fitting device interface. This may be useful, for instance, for fittings taking place in noisy environments and/or when a serial number is difficult to read, e.g. due to an unclear text or small text size.

In one or more example hearing devices, the first control signal is indicative of a force exerted on the hearing device/activated hearing device.

The force exerted on the hearing device may activate the hearing device to provide an identification signal configured to support the identification of the hearing device to be fitted, wherein the identification signal may be the first control signal.

The force may by exerted by means of one or more of: a user activation of a button of the hearing device/activated hearing device, a user movement of the hearing device/activated hearing device, a user tap of the hearing device/activated hearing device and any other suitable application of a force.

In one or more example hearing devices, the hearing device is configured to detect a user customisation of the hearing device and transmit a second control signal indicative of the user customisation.

In one or more example hearing devices, the second control signal is indicative of a force exerted on the hearing device/activated hearing device.

The force may be exerted by means of one or more of: a user activation of a button of the hearing device/activated hearing device, a user movement of the hearing device/activated hearing device, a user tap of the hearing device/activated hearing device and any other suitable application of a force.

The second control signal may be indicative of a user side choice, such as a left-hand side or a right-hand side, for the hearing device.

In one or more example hearing devices, the second control signal is incorporated in and/or transmitted together with the first control signal. Incorporating the second control signal in/with the first control signal may result in a combined first and second control signal. The combined first and second control signal may be indicative of activation of the hearing device and a user side choice, such as a left-hand side or a right-hand side, for the activated hearing device. As an example, the first and second control signal transmitted from an activated hearing device which is and/or is to be assigned as a left hearing device (by/in the fitting device) may be indicative of one push of a button of the hearing device/activated hearing device, a first user movement of the hearing device/activated hearing device or one user tap of the hearing device/activated hearing device and the first and second control signal transmitted from an activated hearing device which is and/or is to be assigned as a right hearing device (by/in the fitting device) may be indicative of two pushes of a button of the hearing device/activated hearing device, a second user movement of the hearing device/activated hearing device or two user taps of the hearing device/activated hearing device.

In one or more example hearing devices, the hearing device interface comprises one or both of a button and an accelerometer configured to detect the force exerted on the hearing device. The button may be beneficial to increase the likelihood of a force being applied purposedly by a user/fitter. The accelerometer may be advantageous to detect a variety of activation movements or taps by a user/fitter. Furthermore, the accelerometer may be advantageously as this does not require a user/fitter to find a button on the hearing device.

A fitting system may be provided. The fitting system may comprise any fitting device disclosed herein and any hearing device disclosed herein.

Since the fitting system comprises disclosed fitting devices and hearing devices, the advantages specified above for the fitting devices and the hearing devices also apply to the fitting system itself.

A method for operating a fitting device may be provided. The method comprises obtaining a list of hearing devices; outputting an initial discovery representation based on the list of hearing devices; receiving a first control signal from an activated hearing device from the list of hearing devices, the first control signal being indicative of a user activation of the activated hearing device and/or the first control signal being transmitted by the activated hearing device in response to the activated hearing device being activated by a user/fitter, wherein the activated hearing device may be represented on the list of hearing devices prior to the user activation; determining a first discovery representation based on the first control signal; and outputting the first discovery presentation.

It is noted that descriptions and features of hearing device functionality, such as hearing device configured to, also apply to methods and vice versa. The hearing device disclosed herein may be configured to perform any of the methods herein. The advantages set out herein for the fitting device may also extend to the method of operating the fitting device.

These and other features and advantages of the invention will become more evident in the light of the following detailed description of preferred embodiments, given only by way of illustrative and non-limiting example, in reference to the attached figures:

FIG. 1 shows an example fitting system 1 comprising a hearing device 2 and a fitting device 8. As illustrated in FIG. 1, the fitting device 8 may be implemented in a single device, such as a computer. The computer may be a tablet computer, a laptop computer, a personal computer or any other suitable computer.

The hearing device 2 comprises a hearing device interface, a hearing device processing unit 10 for provision of an electric output signal 10A and a memory 12. The hearing device 2 illustrated in FIG. 1 may be a hearing aid, wherein the hearing device processing unit 10 is configured to compensate for a hearing loss of a user. Alternatively, the hearing device may be a contralateral routing of signals (CROS) hearing device wherein the hearing device proceeding unit 10 do not provide an electric output signal Yet as alternatives the hearing device may be a hearable, a personal sound amplification product (PSAP), an over-the-counter (OTC) hearing device, etc.

The interface of the hearing device 2 comprises one or more microphones including a first microphone 14 for provision of a first microphone input signal 14A, and optionally one or more further microphones, such as a second microphone 16 for provision of a second microphone input signal 16A. The microphones 14, 16 may be omitted.

The interface of the hearing device 2 comprises a wireless communication unit 18 including a transceiver 19 and an antenna 20. The wireless communication unit 18 is coupled to the hearing device processing unit 10 and configured for wireless communication with the fitting device 8. The interface of the hearing device 2 optionally comprises a button 21 coupled to the hearing device processing unit 10. The button 21 is configured to allow a user/fitter to exert a force on it, e.g. by pressing and/or merely touching the button 21. In other words, a user/fitter may provide user input via the button 21. The hearing device 2 may be configured to, upon or in response to application of a force on the button 21, transmit via the wireless communication unit 18 a first control signal 24 to the fitting device 8, the first control signal 24 being indicative of a user activation of the hearing device/activated hearing device.

The hearing device 2 may comprise any suitable elements to sense a force applied by a user/fitter different from, or in addition to, the button 21. The hearing device 2 may, for example, comprise an accelerometer that may detect a user movement of the hearing device and/or a user tap of the hearing device.

Thus, the interface of the hearing device 2 optionally comprises an accelerometer 22 coupled to the wireless communication unit 18. Alternatively, the accelerometer 22 may be coupled to the hearing device processing unit 10. The accelerometer 22 is configured to allow a user/fitter to exert a force on it, e.g. by one or more of tapping, shaking, and moving the hearing device 2. In other words, a user/fitter may provide user input via the accelerometer 22. The hearing device 2 and/or the hearing device processing unit 10 may be configured to, upon or in response to application of a force on the accelerometer 22, transmit via the wireless communication unit 18 the first control signal 24 to the fitting device 8, the first control signal 24 being indicative of a user activation of the activated hearing device. The user activation of the hearing device turns the hearing device into an activated hearing device.

The wireless communication unit 18/transceiver 19 of the hearing device 2 is configured to convert wireless input signal(s) 25, such as control signals and/or fitting signals including wireless input signal from the fitting device 8, into one or more transceiver input signals 26.

The hearing device processing unit 10 is configured to process one or more input signals 14A, 16A, 26, such as first electric input signals comprising first and second microphone signals 14A, 16A and second electric input signals comprising one or more transceiver input signals 26, and may provide an electric output signal 10A based on one or more of the input signals 14A, 16A, 26.

The interface of the hearing device 2 comprises a receiver 28 for converting the electric output signal 10A to an acoustic output signal. In a CROS hearing device the receiver 28 may be omitted or deactivated, so that no acoustic output signal is provided to the user.

The fitting device 8 outputs, by displaying, an initial discovery representation 30 on a display 31 of the interface of the fitting device 8, the initial discovery representation 30 comprising a discovery region 32. The discovery region 32 includes a schematic representation of a list 34 of hearing devices obtained by a processing unit of the fitting device 8. Each hearing device in the list 34 of hearing devices is represented by a user interface element. As illustrated, the discovery region 32 comprises an initial user interface element 36 representing the hearing device 2 and two other initial user interface elements 38, 40 representing other hearing devices discovered by the fitting device 8. The list 34 of hearing devices may be represented by a single user interface element.

The initial discovery representation 30 displayed on the display 31 optionally comprises a first region 42 separate from, i.e. non-overlapping with, the discovery region 32, the first region comprising a right region 44 and/or a left region 46. As illustrated in FIG. 1, one or both of the right region 44 and the left region 46 may, in the initial discovery representation be empty. An empty region 44, 46 indicates to the user/fitter that no hearing device has been selected and/or identified as a right and/or left hearing device to be fitted.

Figure 2A:
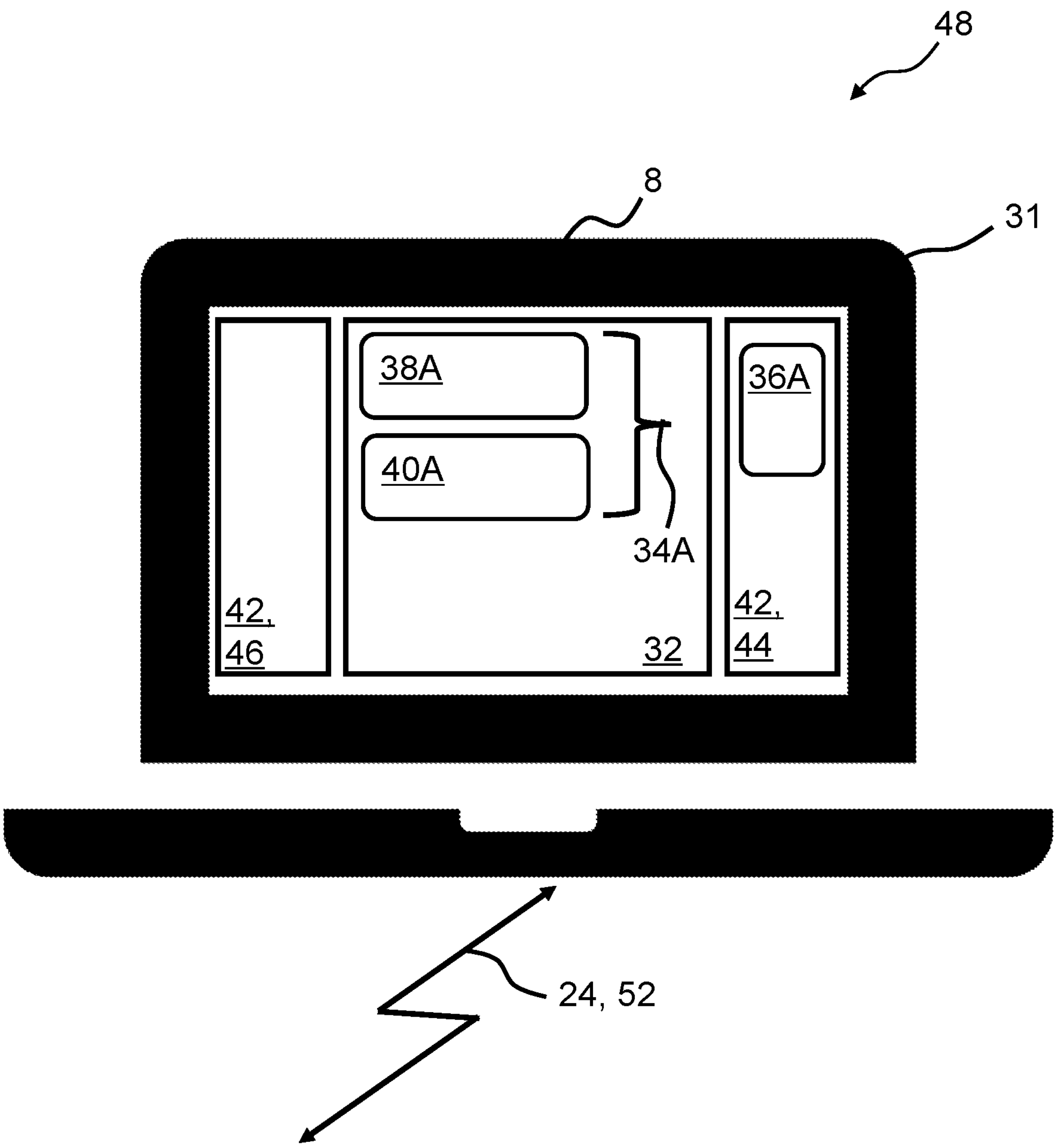
FIG. 2*a* depicts an exemplary fitting device with an example first discovery representation.

FIG. 2*a* represents a fitting device 8, such as the fitting device 8 of FIG. 1, after receiving a first control signal 24 from the hearing device 2 of FIG. 1. The first control signal 24 is transmitted by the hearing device 2 when a user/fitter exerts a force on the button 21, e.g. by pressing the button 21, and/or on the accelerometer 22, e.g. by shaking or tapping the hearing device 2. The hearing device 2 is, after user activation of the hearing device where a user/fitter exerts a force on the button 21 and/or on the accelerometer 22 initiating transmission of the first control signal 24 to the fitting device, acknowledge by the fitting device 8 as an activated hearing device. Upon reception of the first control signal 24, the fitting device 8 determines a first discovery representation and outputs, by displaying, the first discovery representation 48 on the display 31 of the interface of the fitting device 8.

The first discovery representation 48 of FIG. 2*a* comprises the discovery region 32 and a first region 42 separate from the discovery region 32. The discovery region 32 comprises a list 34A of hearing devices which have not been activated i.e. the hearing devices of list 34 which have not transmitted the first control signal 24. Accordingly, the discovery region 32 of the first discovery representation 48 comprises user interface elements 38A, 40A indicative of discovered but not activated hearing devices. User interface elements 38A, 40A may have the same shape, size, and/or context as the initial user interface elements 38, 40, respectively, of the initial discovery representation 30. The first region 42 comprises a right region 44 and a left region 46. The right region 44 and the left region 46 may be separate from each other. The right region 44 may be arranged to the right of the discovery region 32 and/or the left region 46 may be arranged to the left of the discovery region 32 (when looking at the display 31 of the interface of the fitting device, i.e. a fitting device screen). In the illustrated example, the activated hearing device 2 is a right hearing device, i.e. a device configured to be worn in or at the right ear of a user. A side identifier may be included in the first control signal 24 and/or in a discovery signalling from the hearing device 2 allowing the fitting device 8 to assign the hearing device 2 to the right region 44 or the left region 46. Optionally, a second control signal 52 may be incorporated in and/or transmitted together with the first control signal 24. Incorporating the second control signal 52 in/with the first control signal 24 may result in a combined first and second control signal. The combined first and second control signal may be indicative of activation of the hearing device and a user side choice, such as a left-hand side or a right-hand side, for the activated hearing device. As an example, the first and second control signals 24, 52 transmitted form the hearing device which is and/or is to be assigned as a left hearing device by/in the fitting device 8 may be indicative of one push of a button of the hearing device/activated hearing device, a first user movement of the hearing device/activated hearing device or one user tap of the hearing device/activated hearing device and the first and second control signals 24, 52 transmitted form a hearing device which is and/or is to be assigned as a right hearing device by/in the fitting device may be indicative of two pushes of a button of the hearing device/activated hearing device, a second user movement of the hearing device/activated hearing device or two user taps of the hearing device/activated hearing device respectively.

Hence, in the first discovery representation 48, the activated hearing device (in the initial discovery representation 30 depicted by the initial user interface element 36) is represented by a first user interface element 36A in the right region 44 of the first region 42. The initial user interface element 36 representing the first hearing device is thus upon receipt of the first control signal 24 removed from the list of hearing devices in the discovery region 32 of the initial discovery representation 30 and added as the first user interface element 36A to the first region 42 of the first discovery representation 48. The other hearing devices obtained in the initial discover representation 30 remain in the list 34A of discovered but not activated hearing devices. Alternatively, a right hearing device represented by the first user interface element 36A may be assigned to the left region 46 of the first region 42. The activated hearing device represented by the first user interface element 36A may be a first hearing device.

Figure 2B:
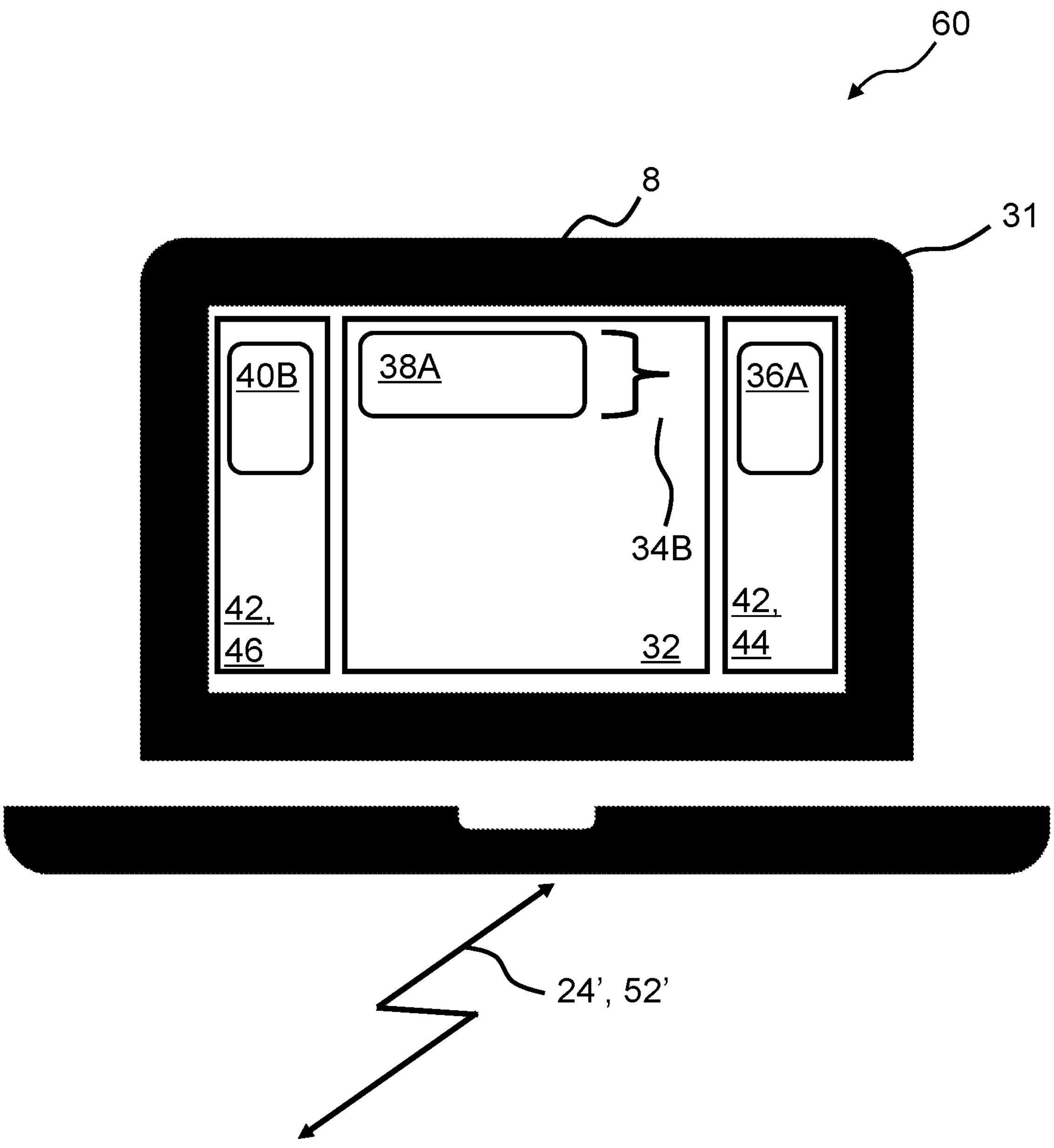
FIG. 2*b* depicts an exemplary fitting device with an example third discovery representation.

FIG. 2*b* represents a fitting device 8, such as the fitting device 8 of FIG. 2*a*, after receiving a first control signal 24' from a second hearing device. The second hearing device may be of the same or a different type than the hearing device 2 of FIG. 1. The first control signal 24' is transmitted by the second hearing device when a user/fitter exerts a force on the button 21, e.g. by pressing the button 21, and/or on the accelerometer 22, e.g. by shaking or tapping the second hearing device. The second hearing device is, after user activation of the second hearing device where a user/fitter exerts a force on the button 21 and/or on the accelerometer 22 initiating transmission of the first control signal 24' to the fitting device, acknowledge by the fitting device 8 as an activated hearing device. Upon reception of the first control signal 24', the fitting device 8 determines a third discovery representation and outputs, by displaying, the third discovery representation 60 on the display 31 of the interface of the fitting device 8.

The third discovery representation 60 of FIG. 2*b* may follow the first discovery representation 48 of FIG. 2*a*. The third discovery representation 60 comprises the discovery region 32 and the first region 42 separate from the discovery region 32. The discovery region 32 comprises a list 34B of hearing devices which have not been activated i.e. the hearing devices of list 34 and/or 34A which have not transmitted the first control signal 24 or 24' respectively. Accordingly, the discovery region 32 of the third discovery representation 60 comprises user interface elements 38A indicative of discovered but not activated hearing devices. User interface elements 38A may have the same shape, size, and/or context as the initial user interface element 38, of the initial discovery representation 30. The first region 42 comprises a right region 44 and a left region 46. The right region 44 and the left region 46 may be separate from each other. The right region 44 may be arranged to the right of the discovery region 32 and/or the left region 46 may be arranged to the left of the discovery region 32 (when looking at the display 31 of the interface of the fitting device i.e. a fitting device screen). In the illustrated example, the second activated hearing device is a left hearing device, i.e. a device configured to be worn in or at the left ear of a user. A side identifier may be included in the first control signal 24' and/or in a discovery signalling from the second hearing device allowing the fitting device 8 to assign the second hearing device to the right region 44 or the left region 46. Hence, in the third discovery representation 60, the second activated hearing device (in the initial discovery representation 30 depicted by the initial user interface element 40) is represented by a second user interface element 40B in the left region 46 of the first region 42. The user interface element 40A representing the second hearing device is thus upon receipt of the first control signal 24' removed from the list of hearing devices in the discovery region 32 of the first discovery representation 48 and added as the second user interface element 40B to the first region 42 of the third discovery representation 60. The other hearing devices obtained in the initial discover representation 30 remain in the list 34B of discovered but not activated hearing devices. Alternatively, a right hearing device represented by the second user interface element 40B may be assigned to the right region 44 of the first region 42.

As described in FIG. 2*a*, a second control signal 52' may optionally be incorporated in and/or transmitted together with the first control signal 24'.

Figure 2C:
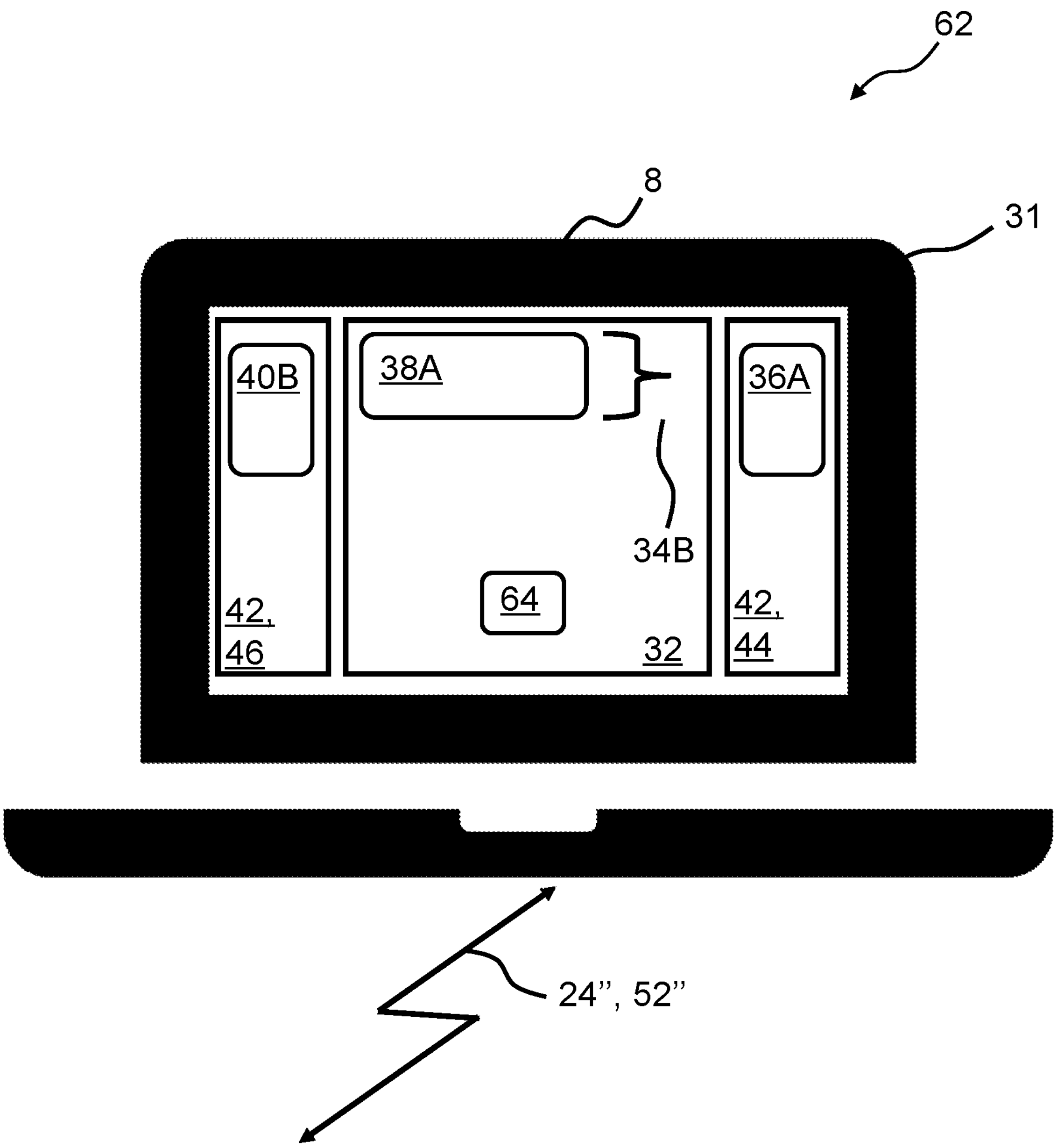
FIG. 2*c* depicts an exemplary fitting device with an example fourth discovery representation.

FIG. 2*c* represents a fitting device 8, such as the fitting device 8 of FIGS. 2*a* and 2*b*, after receiving a first control signal 24" from a third hearing device. The third hearing device may be of the same or a different type than the hearing device 2 of FIG. 1. The first control signal 24" is transmitted by the third hearing device when a user/fitter exerts a force on the button 21, e.g. by pressing the button 21, and/or on the accelerometer 22, e.g. by shaking or tapping the third hearing device. The third hearing device is, after user activation of the hearing device where a user/fitter exerts a force on the button 21 and/or on the accelerometer 22 initiating transmission of the first control signal 24 to the fitting device, acknowledge by the fitting device 8 as an activated hearing device. Upon reception of the first control signal 24", the fitting device 8 determines a fourth discovery representation and outputs, by displaying, the fourth discovery representation 62 on the display 31 of the interface of the fitting device 8.

The fourth discovery representation 62 of FIG. 2*c* may follow the third discovery representation 60 of FIG. 2*b* and further comprise a warning interface element 64 notifying the user/fitter that two hearing devices, i.e. a first hearing device and a second hearing device, are assigned to the first region 42, such as to the right region 44 and the left region 46 of the first region 42 and/or instruct the user/fitter to unassign one of the assigned hearing devices in order to assign the third hearing device to the first region 42. The warning interface element 64 may appear anywhere on the fourth discovery representation 62 and take any suitable form, such as a text box, such as a pop-up text box.

As described in FIG. 2*a*, a second control signal 52" may optionally be incorporated in and/or transmitted together with the first control signal 24".

Figure 3:
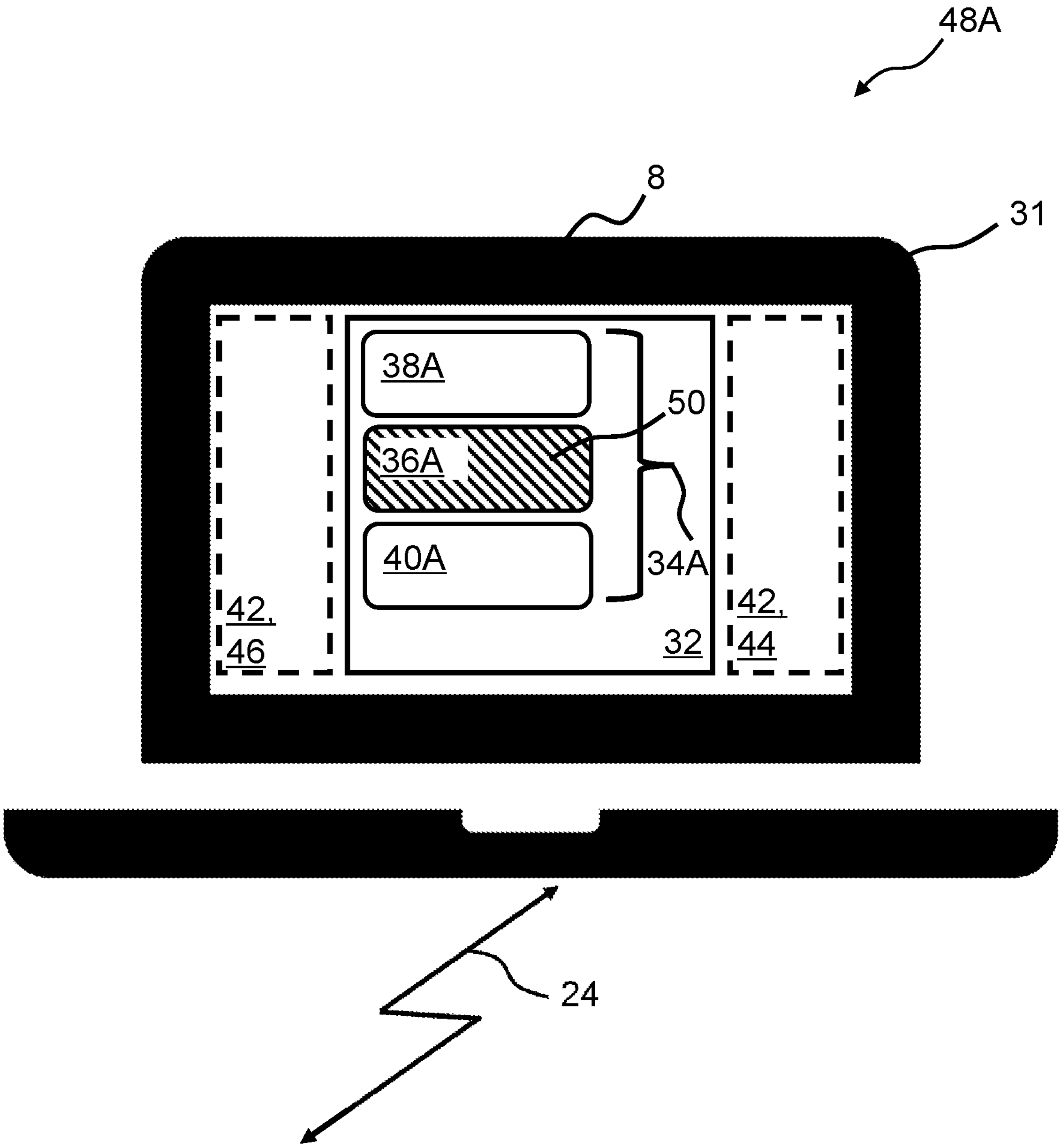
FIG. 3 shows an example fitting device with an example first discovery representation.

FIG. 3 shows an example fitting device 8, such as the fitting device 8 of FIG. 1, after receiving a first control signal 24 from the hearing device 2. The first control signal 24 is transmitted by the hearing device 2 of FIG. 1 when a user/fitter exerts a force on the button 21, e.g. by pressing the button 21, and/or on the accelerometer 22, e.g. by shaking or tapping the hearing device 2. The hearing device 2 is, after user activation of the hearing device where a user/fitter exerts a force on the button 21 and/or on the accelerometer 22 initiating transmission of the first control signal 24 to the fitting device, acknowledge by the fitting device 8 as an activated hearing device. Upon reception of the first control signal 24, the fitting device 8 determines a first discovery representation and outputs, by displaying, the first discovery representation 48A on the display 31 of the interface of the fitting device 8.

The first discovery representation 48A of FIG. 3 comprises the discovery region 32 and a first region 42 separate from the discovery region 32. The discovery region 32 comprises a list 34A of hearing devices discovered by the fitting device 8. Each hearing device in the list 34A of hearing devices is represented by a user interface element. As illustrated, the discovery region 32 comprises a first user interface element 36A representing the activated hearing device 2 and two other user interface elements 38A, representing discovered but not activated hearing devices. The discovery region 32, such as first user interface element 36A comprises a selection indicator 50. In FIG. 3, the selection indicator 50 is a shading and/or colour indicator by means of which the activated hearing device 2 is identified among the list 34A of hearing devices. In one or more example first discovery representations, the selection indicator 50 may be included as a separate user interface element aligned with the first user interface element.

Figure 4:
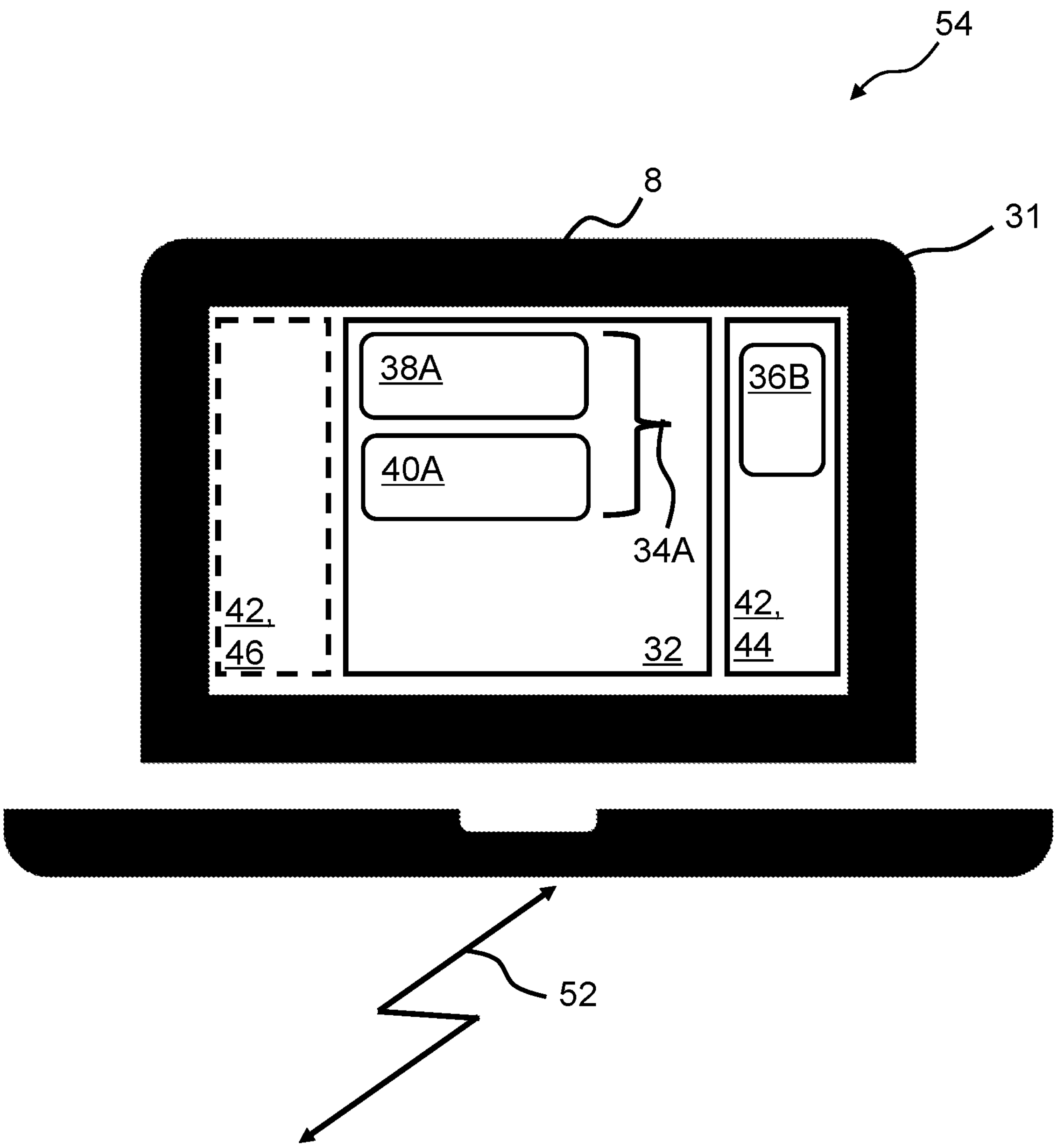
FIG. 4 represents an example fitting device with an example second discovery representation.

FIG. 4 represents an example fitting device 8, such as the fitting device 8 of FIG. 1, after receiving, e.g. when outputting the first discovery representation 48A, a second control signal 52 from the hearing device 2 of FIG. 1. The second control signal being indicative of a user customisation of the activated hearing device, such as right side selection. The second control signal 52 may be transmitted by the hearing device 2 when a user/fitter exerts a force on the button 21, e.g. by pressing the button 21, and/or on the accelerometer 22, e.g. by shaking or tapping the hearing device 2. Upon reception of the second control signal 52, the fitting device 8 determines a second discovery representation and outputs, by displaying, the second discovery representation 54 on the display 31 of the interface of the fitting device 8.

The second discovery representation 54 comprises the discovery region 32 and a first region 42 separate from the discovery region 32. The discovery region 32 comprises a list 34A of hearing devices which have not been activated, e.g. the hearing devices of list 34A in FIG. 3 which have not transmitted the first and second control signal 24, 52. Accordingly, the discovery region 32 of the second discovery representation 54 comprises user interface elements 38A, 40A indicative of discovered but not activated hearing devices. User interface elements 38A, 40A may have the same shape, size, and/or context as the initial user interface elements 38, 40, respectively, of the initial discovery representation 30. The first region 42 comprises a right region 44 and optionally a left region 46. The right region 44 may be arranged to the right of the discovery region 32 (when looking at the display 31 of the interface of the fitting device, i.e. a fitting device screen). In the illustrated example, the activated hearing device 2 is a right hearing device, i.e. a hearing device configured to be worn in or at the right ear of a user. A side identifier may be included in the first control signal 24, the second control signal 52 and/or in a discovery signalling from the hearing device 2 allowing the fitting device 8 to assign the hearing device 2 to the right region 44 or the left region 46 according to the side identifier. Hence, in the second discovery representation 54, the activated hearing device (in the initial discovery representation 30 depicted by initial user interface element 36) is represented by a second user interface element 36B in the right region 44 of the first region 42. The other hearing devices obtained in the initial discover representation 30 remain in the list 34A of discovered but not activated hearing devices. Alternatively, the first region 42 comprises a left region 46 and optionally a right region 44, and a right hearing device represented by the first user interface element 36B is assigned to the left region 46 of the first region 42. The left region 46 may be arranged to the left of the discovery region 32 (when looking at the display 31 of the interface of the fitting device, i.e. a fitting device screen).

In one or more example fitting devices, the fitting device 8/fitting device processing unit, when outputting the first discovery representation 48A, may be configured to detect a drag-and-drop user input indicative of a user/fitter assigning the activated hearing device 2 as a left or a right hearing device, e.g. a user/fitter dragging and dropping the first user interface element 36A in the right region 44 or the left region 46; and e.g. in response to detecting the drag-and-drop user input indicative of a user/fitter assigning the activated hearing device 2 as a right hearing device, output the second discovery representation 54 and assign the hearing device 2 as the right hearing device and/or in response to detecting the drag-and-drop user input indicative of a user/fitter assigning the activated hearing device 2 as a left hearing device, output the second discovery representation 54 and assign the hearing device 2 as the left hearing device.

In one or more example fitting devices, the fitting device 8/fitting device processing unit is configured to receive a second control signal 52 from the activated hearing device, the second control signal 52 being indicative of a user customization, such as left or right side selection, of the activated hearing device; determine the second discovery representation 54 based on the second control signal 52; and output the second discovery presentation on the fitting device interface/display 31. Thus, the second discovery representation 54 may be output in response to the activated hearing device being activated a second time and thus transmitting a second control signal 52 to the fitting device 8.

Figure 5:
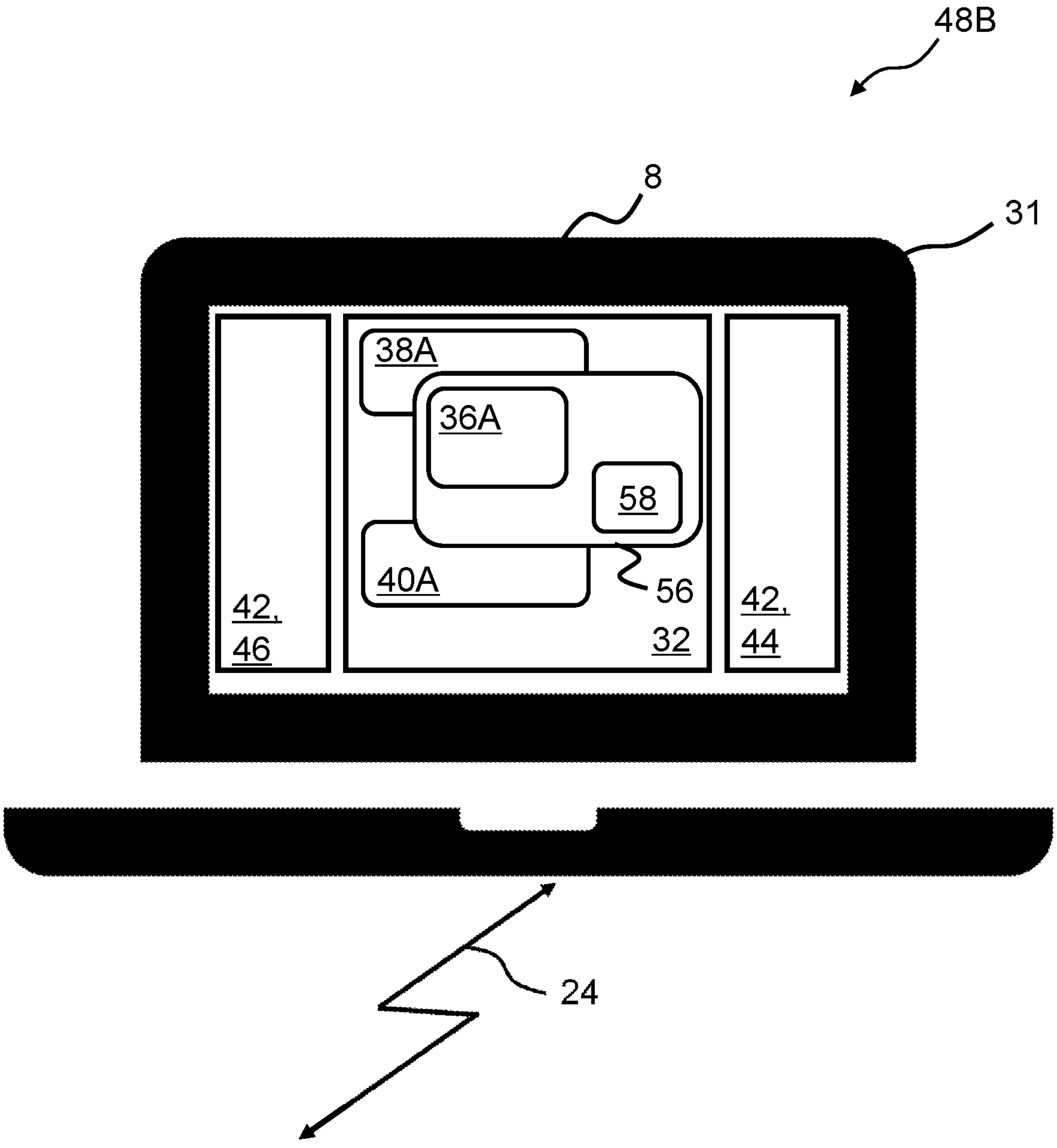
FIG. 5 shows an example fitting device with an example first discovery representation.

FIG. 5 shows a fitting device 8, such as the fitting device 8 of FIG. 1, after receiving a first control signal 24 from the hearing device 2 of FIG. 1. The first control signal 24 is transmitted by the hearing device 2 when a user/fitter exerts a force on the button 21, e.g. by pressing the button 21, and/or on the accelerometer 22, e.g. by shaking or tapping the hearing device 2. The hearing device 2 is, after user activation of the hearing device where a user/fitter exerts a force on the button 21 and/or on the accelerometer 22 initiating transmission of the first control signal 24 to the fitting device, acknowledge by the fitting device 8 as an activated hearing device. Upon reception of the first control signal 24, the fitting device 8 determines a first discovery representation and outputs, by displaying, the first discovery representation 48B on the display 31 of the interface of the fitting device 8.

The first discovery representation 48B of FIG. 5 comprises the discovery region 32 and a first region 42 separate from the discovery region 32. The discovery region 32 comprises a list of hearing devices represented by user interface elements 36A, 38A, 40A as also described in relation to FIG. 2*a* above. The first user interface element 36A may be omitted.

The first discovery representation 48B of FIG. 5 comprises the discovery region 32, a pop-up region or window 56, a right region 44 and a left region 46. When the first control signal 24 transmitted by the activated hearing device 2 is received by the fitting device 8, a first user interface element 36A representing the activated hearing device 2 is shown in the pop-up region 56. The pop-up region 56 may comprise a user input box 58 to allow a user/fitter to assign, select, or confirm the activated hearing device 2 to the right region 44, for example if the hearing device is a right hearing device as indicated by a side identifier, or to the left region 44, for example if the hearing device is a left hearing device as indicated by a side identifier. Alternatively, a user/fitter may assign, select, or confirm the activated hearing device 2 to the right region 44 if the hearing device is a left hearing device as indicated by a side identifier, or to the left region 44, for example if the hearing device is a right hearing device as indicated by a side identifier In one or more examples, the first discovery representation 48B, e.g. where the fitting device 8 already has information on a side identifier of the hearing device, the user input box 58 is configured to allow a user/fitter to confirm the assignment of the activated hearing device 2 according to the side identifier, e.g. by a user activating the user input box or activating the hearing device, resulting in a second control signal 52 from the hearing device 2 as also described above in relation to FIG. 4. In one or more examples, the first discovery representation 48B, e.g. where the fitting device 8 does not have information on a side identifier of the hearing device, the user input box 58 may comprise a left selector and a right selector. The fitting device is then configured to assign the activated hearing device to a side according to the user selection of the left or right selector and determine a second discovery representation according to the selection, e.g. by including the second user interface element 36B (see FIG. 4) in the right region 44 if the right selector is activated or in the left region 46 if the left selector is activated. The user input box with left and right selector may be adequate if the activated hearing device 2 is a device that is suitable for both the right ear and the left ear.

The first discovery representation 48B may be used in combination with a second control signal from the activated hearing device 2 as described in FIG. 4. This may enable for an addition or an alternative to the assignation by means of a confirmation and/or selector described in with reference to FIG. 5.

Figure 6:
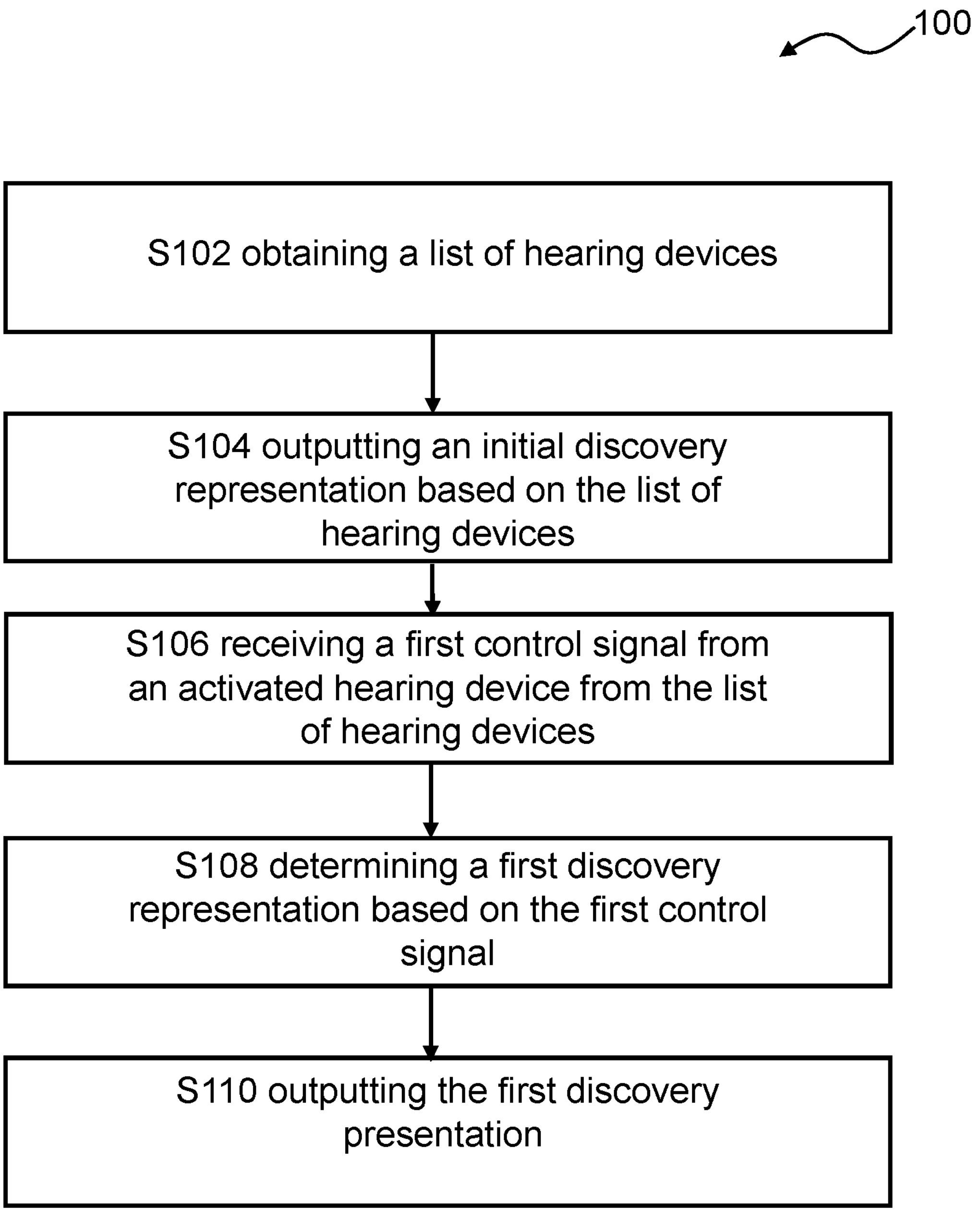
FIG. 6 is a flow chart illustrating an exemplary method for operating a fitting device.

FIG. 6 is a flow diagram of an exemplary method 100 for operating a fitting device comprising a fitting device interface and a fitting device processing unit. The method 100 comprises obtaining S102 a list of hearing devices, e.g. during a discovery or scanning procedure. The list of hearing devices may be obtained by the fitting device processing unit. The method 100 comprises outputting S104 an initial discovery representation based on the list of hearing devices. The initial discovery representation may be outputted by the fitting device processing unit and/or on/through the fitting device interface. The method 100 comprises receiving S106 a first control signal from a hearing device from the list of hearing devices, the first control signal being indicative of a user activation of the hearing device/activated hearing device. The first control signal may be received by the fitting device processing unit. The method 100 comprises determining S108 a first discovery representation based on the first control signal. The first discovery representation may be determined by the fitting device processing unit. The method 100 comprises outputting S110 the first discovery presentation, e.g. by displaying a the first discovery presentation on a display of the fitting device interface.

The use of the terms "first", "second"; "primary", "secondary", etc. does not imply any particular order (let alone a specific spatial or temporal order, or an order of importance). Rather the reverse, the terms "first", "second"; "primary", "secondary", etc. are included to identify individual elements, that is, they are provided for labelling purposes with an aim to distinguish elements from each other. Furthermore, the labelling of a first element does not imply the presence of a second element and vice versa.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the examples may be implemented at least in part by means of both hardware and software, and that several "means", "units", "features" or "devices" may be represented by the same item of hardware.

The various exemplary methods, devices and systems described herein are described in the general context of method steps or processes, which may be implemented by a computer program product, embodied in a computer-readable medium (including computer-executable instructions, such as program code) and executed by computers in networked environments. A computer-readable medium may include removable and non-removable storage devices including, but not limited to: Read Only Memory (ROM), Random Access Memory (RAM), compact discs (CDs), digital versatile discs (DVD) and any other suitable storage device. Generally, program circuitries may include routines, programs, objects, components, data structures, etc. that perform specified tasks or implement specific abstract data types. Computer-executable instructions, associated data structures and program circuitries represent examples of program code for executing steps of the methods disclosed herein. The particular sequence of such executable instructions or associated data structures represents examples of corresponding acts for implementing the functions described in such steps or processes.

Although example features have been shown and described, it will be understood that they are not intended to limit the claimed disclosure, and it will be made obvious to those skilled in the art that various changes and modifications may be made without departing from the scope of the claimed disclosure. The specification and drawings are, accordingly, to be regarded in an illustrative rather than restrictive sense. The claimed disclosure is intended to cover all alternatives, modifications, and equivalents.

Also disclosed are fitting devices, hearing devices, and fitting systems according to any of the following items.

Item 1. A fitting device for fitting a hearing device, the fitting device comprising a fitting device interface and a fitting device processing unit, wherein the fitting device processing unit is configured to:
obtain a list of hearing devices;
output an initial discovery representation on the fitting device interface based on the list of hearing devices;
receive a first control signal from an activated hearing device from the list of hearing devices, the first control signal being indicative of a user activation of the activated hearing device;
determine a first discovery representation based on the first the control signal; and
output the first discovery representation on the fitting device interface.

Item 2. Fitting device of item 1, wherein the initial discovery representation comprises a schematic representation of the list of hearing devices.

Item 3. Fitting device of any one of items 1 to 2, wherein the initial discovery representation comprises a discovery region including the list of hearing devices.

Item 4. Fitting device of item 3, wherein the first discovery representation comprises the discovery region including the list of hearing devices and a selection indicator of the activated hearing device.

Item 5. Fitting device of item 4, wherein the selection indicator comprises one or more of: a colour indicator, a symbol indicator, a highlight indicator, an around-box indicator and a shading indicator.

Item 6. Fitting device of any of items 3 to 5, wherein the first discovery representation comprises the discovery region including the list of hearing devices and a first region separate from the discovery region, wherein the activated hearing device is represented, in the initial discovery representation, by an initial user interface element in the discovery region, and wherein the activated hearing device is represented, in the first discovery representation, by a first user interface element in the first region.

Item 7. Fitting device of any of items 1 to 6, wherein the first control signal is indicative of a force exerted on the activated hearing device.

Item 8. Fitting device of item 7, wherein the first control signal is indicative of one or more of: a user activation of a button of the activated hearing device, a user movement of the activated hearing device and user tap of the activated hearing device.

Item 9. Fitting device of any of items 1 to 8, wherein the fitting device processing unit is configured to:
receive a second control signal from the activated hearing device, the second control signal being indicative of a user customization of the activated hearing device;

Item 10. Fitting device of item 9, wherein the fitting device processing unit is configured to:

determine a second discovery representation based on the second control signal; and output the second discovery presentation on the fitting device interface.

Item 11. Fitting device of item 9 to 10, wherein the second discovery representation comprises a schematic representation of the list of hearing devices, a selection indicator of the activated hearing device and a customization indicator of the activated hearing device.

Item 12. Fitting device of any of items 9 to 11, wherein the second control signal is indicative of a user side choice, such as a left-hand side or a right-hand side, for the activated hearing device.

Item 13. Fitting device of any of items 9 to 12, wherein the second control signal is indicative of a force exerted on the activated hearing device.

Item 14. Fitting device of item 13, wherein the second control signal is indicative of one or more of: a user activation of a button of the activated hearing device, a user movement of the activated hearing device and user tap of the activated hearing device.

Item 15. Fitting device of any of items 9 to 14, wherein the second control signal is incorporated in and/or transmitted together with the first control signal.

Item 16. A hearing device comprising a hearing device interface and a hearing device processing unit, wherein the hearing device is configured to detect a user activation of the hearing device and transmit a first control signal indicative of the user activation.

Item 17. Hearing device of item 16, wherein the first control signal is indicative of a force exerted on the hearing device.

Item 18. Hearing device of item 17, wherein the first control signal is indicative of one or more of: a user activation of a button of the hearing device, a user movement of the hearing device and user tap of the hearing device.

Item 19. Hearing device of any of items 16 to 18, wherein the hearing device is configured to detect a user customisation of the hearing device and transmit a second control signal indicative of the user customisation.

Item 20. Hearing device of item 19, wherein the second control signal is indicative of a force exerted on the hearing device.

Item 21. Hearing device of item 20, wherein the second control signal is indicative of one or more of: a user activation of a button of the hearing device, a user movement of the hearing device and user tap of the hearing device.

Item 22. Hearing device of any of items 19 to 21, wherein the second control signal is indicative of a user side choice, such as a left-hand side or a right-hand side, for the hearing device.

Item 23. Hearing device of any of items 19 to 22, wherein the second control signal is incorporated in and/or transmitted together with the first control signal.

Item 24. Hearing device of any of items 16 to 23, wherein the interface comprises one or both of a button and an accelerometer configured to detect the force exerted on the hearing device.

Item 25. A fitting system comprising a fitting device according to any one of items 1 to 15 and a hearing device according to items 16 to 24.

Item 26. A method of operating a fitting device, the method comprising:

obtaining a list of hearing devices;

outputting an initial discovery representation based on the list of hearing devices;

receiving a first control signal from an activated hearing device from the list of hearing devices, the first control signal being indicative of a user activation of the activated hearing device;

determining a first discovery representation based on the first control signal; and outputting the first discovery presentation.

LIST OF REFERENCES

1 fitting system
2 hearing device
8 fitting device
10 hearing device processing unit
10A electric output signal
12 memory
14 first microphone
14A first microphone input signal
16 second microphone
16A second microphone input signal
18 wireless communication unit
19 transceiver
20 antenna
21 button
22 accelerometer
24, 24', 24" first control signal
25 wireless input signal
26 transceiver input signal
28 receiver
30 initial discovery representation
31 display
32 discovery region
34 list of hearing devices in initial discovery representation
34A list of hearing devices in first discovery representation
34B list of hearing devices in third and/or fourth discovery representation
36 initial user interface element
36A first user interface element
38 initial user interface element
38A user interface element
40 initial user interface element
40A user interface element
40B second user interface element
42 first region
44 right region
46 left region
48, 48A, 48B first discovery representation
50 selection indicator
52, 52', 52" second control signal
54 second discovery representation
56 pop-up region or window
58 user input box
60 third discovery representation
62 fourth discovery representation
64 warning interface element
100 method for operating a fitting device
S102 obtaining a list of hearing devices
S104 outputting an initial discovery representation based on the list of hearing devices
S106 receiving a first control signal from an activated hearing device from the list of hearing devices S108 determining a first discovery representation based on the first control signal S110 outputting the first discovery presentation

The invention claimed is:

1. A fitting device for fitting a hearing device, the fitting device comprising a fitting device interface and a fitting device processing unit, wherein the fitting device processing unit is configured to:

obtain a list of hearing devices;

provide an initial discovery representation for output by the fitting device interface, wherein the initial discover representation is based on the list of hearing devices;

receive a first control signal from an activated hearing device, the activated device being one of the hearing devices in the list, the first control signal being associated with a user activation of the activated hearing device;

determine a first discovery representation based on the first the control signal; and provide the first discovery representation for output by the fitting device interface;

wherein the fitting device processing unit is configured to receive a second control signal from the activated hearing device, and wherein the second control signal is indicative of a user side choice for the activated hearing device, the user side choice being a selection of a left-side or a right-side for the activated hearing device.

2. The fitting device of claim 1, wherein the initial discovery representation comprises a representation of the list of hearing devices.

3. The fitting device of claim 1, wherein the initial discovery representation is configured to identify the list of hearing devices.

4. The fitting device of claim 1, wherein each of the initial discovery representation and the first discovery representation comprises a discovery region, and a first region separate from the discovery region;

wherein the one of the hearing devices is represented by an initial user interface element in the discovery region of the initial discovery representation, and wherein the one of the hearing devices is represented by a first user interface element in the first region of the first discovery representation after the fitting device processing unit of the fitting device receives the first control signal.

5. The fitting device of claim 1, wherein the first control signal is indicative of a force exerted on the activated hearing device.

6. The fitting device of claim 1, wherein the user activation comprises one or more of: an activation of a button of the activated hearing device, a movement of the activated hearing device, or a tapping on the activated hearing device; and wherein the first control signal is indicative of one or more of: the activation of the button of the activated hearing device, the movement of the activated hearing device, or the tapping on the activated hearing device.

7. The fitting device of claim 1, wherein the second control signal is incorporated with the first control signal.

8. The fitting device of claim 1, wherein the second control signal is transmitted together with the first control signal.

9. A fitting system comprising the fitting device of claim 1, and the hearing device.

10. The fitting system of claim 9, wherein the hearing device is configured to detect the user activation of the hearing device, and transmit the first control signal indicative of the user activation.

11. A fitting device for fitting a hearing device, the fitting device comprising a fitting device interface and a fitting device processing unit, wherein the fitting device processing unit is configured to:

obtain a list of hearing devices;

provide an initial discovery representation for output by the fitting device interface, wherein the initial discover representation is based on the list of hearing devices;

receive a first control signal from an activated hearing device, the activated device being one of the hearing devices in the list, the first control signal being associated with a user activation of the activated hearing device;

determine a first discovery representation based on the first the control signal; and provide the first discovery representation for output by the fitting device interface;

wherein the fitting device processing unit is configured to receive a second control signal from the activated hearing device; and wherein the fitting device processing unit is configured to:

determine a second discovery representation based on the second control signal; and provide the second discovery presentation for output by the fitting device interface.

12. The fitting device of claim 11, wherein the initial discovery representation comprises a representation of the list of hearing devices.

13. The fitting device of claim 11, wherein the initial discovery representation is configured to identify the list of hearing devices.

14. The fitting device of claim 11, wherein each of the initial discovery representation and the first discovery representation comprises a discovery region, and a first region separate from the discovery region;

wherein the one of the hearing devices is represented by an initial user interface element in the discovery region of the initial discovery representation, and wherein the one of the hearing devices is represented by a first user interface element in the first region of the first discovery representation after the fitting device processing unit of the fitting device receives the first control signal.

15. The fitting device of claim 11, wherein the first control signal is indicative of a force exerted on the activated hearing device.

16. The fitting device of claim 11, wherein the user activation comprises one or more of: an activation of a button of the activated hearing device, a movement of the activated hearing device, or a tapping on the activated hearing device; and wherein the first control signal is indicative of one or more of: the activation of the button of the activated hearing device, the movement of the activated hearing device, or the tapping on the activated hearing device.

17. The fitting device of claim 11, wherein the second control signal is incorporated with the first control signal.

18. The fitting device of claim 11, wherein the second control signal is transmitted together with the first control signal.

19. A fitting device for fitting a hearing device, the fitting device comprising a fitting device interface and a fitting device processing unit, wherein the fitting device processing unit is configured to:

obtain a list of hearing devices;

provide an initial discovery representation for output by the fitting device interface, wherein the initial discover representation is based on the list of hearing devices;

receive a first control signal from an activated hearing device, the activated device being one of the hearing devices in the list, the first control signal being associated with a user activation of the activated hearing device;

determine a first discovery representation based on the first the control signal; and provide the first discovery representation for output by the fitting device interface;

wherein the fitting device processing unit is configured to receive a second control signal from the activated hearing device, and wherein the second control signal is indicative of a user customization of the activated hearing device.

20. The fitting device of claim 19, wherein the initial discovery representation comprises a representation of the list of hearing devices.

21. The fitting device of claim 19, wherein the initial discovery representation is configured to identify the list of hearing devices.

22. The fitting device of claim 19, wherein each of the initial discovery representation and the first discovery representation comprises a discovery region, and a first region separate from the discovery region;

wherein the one of the hearing devices is represented by an initial user interface element in the discovery region of the initial discovery representation, and wherein the one of the hearing devices is represented by a first user interface element in the first region of the first discovery representation after the fitting device processing unit of the fitting device receives the first control signal.

23. The fitting device of claim 19, wherein the first control signal is indicative of a force exerted on the activated hearing device.

24. The fitting device of claim 19, wherein the user activation comprises one or more of: an activation of a button of the activated hearing device, a movement of the activated hearing device, or a tapping on the activated hearing device; and wherein the first control signal is indicative of one or more of: the activation of the button of the activated hearing device, the movement of the activated hearing device, or the tapping on the activated hearing device.

25. The fitting device of claim 19, wherein the second control signal is incorporated with the first control signal.

26. The fitting device of claim 19, wherein the second control signal is transmitted together with the first control signal.

27. A hearing device comprising:

a hearing device interface; and a hearing device processing unit, wherein the hearing device is configured to detect a user activation of the hearing device and transmit a first control signal indicative of the user activation; and wherein the hearing device is configured to provide a second control signal indicative of a user side choice for the hearing device, the user side choice being a selection of a left-side or a right-side for the hearing device.

28. The hearing device of claim 27, wherein the hearing device is configured to transmit the first control signal indicative of the user activation to a fitting device.

29. The hearing device of claim 27, wherein the hearing device interface comprises a button configured to detect a force exerted on the hearing device.

30. The hearing device of claim 27, wherein the hearing device interface comprises an accelerometer configured to detect a force exerted on the hearing device.

31. The hearing device of claim 27, wherein the first control signal is based on a movement of the hearing device.

32. The hearing device of claim 27, wherein the first control signal is based on a force exerted on the hearing device.

33. The hearing device of claim 27, wherein the hearing device is configured to transmit the first control signal and the second control signal for reception by a fitting device.

34. The hearing device of claim 27, wherein the second control signal is incorporated with the first control signal.

35. The hearing device of claim 27, wherein the hearing device is configured to transmit the second control signal together with the first control signal.

36. A method performed by a fitting device, the method comprising:

obtaining a list of hearing devices;

outputting an initial discovery representation based on the list of hearing devices;

receiving a first control signal from an activated hearing device, the activated hearing device being one of the hearing devices in the list, the first control signal being associated with a user activation of the activated hearing device;

determining a first discovery representation based on the first control signal;

outputting the first discovery presentation; and receiving a second control signal from the activated hearing device, wherein the second control signal is indicative of a user side choice for the activated hearing device, the user side choice being a selection of left-side or a right-side for the activated hearing device.

* * * * *